April 12, 1927.
L. P. HUTT
VALVE
Filed Feb. 3, 1925.
1,624,736
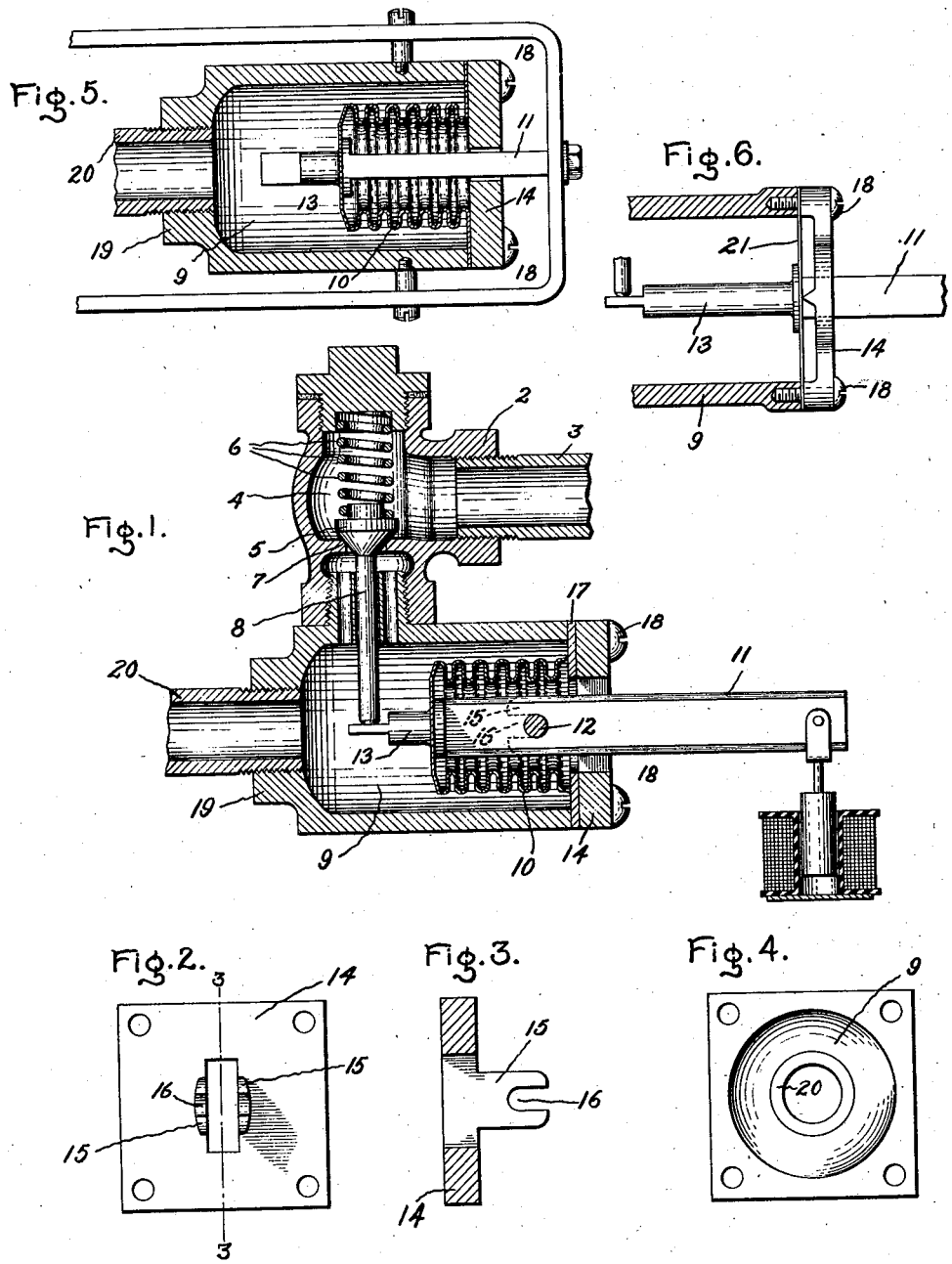
Inventor:
Leonard P. Hutt,
by Alexander S. ____
His Attorney.

Patented Apr. 12, 1927.

1,624,736

UNITED STATES PATENT OFFICE.

LEONARD P. HUTT, OF SCHENECTADY, NEW YORK, ASSIGNOR TO GENERAL ELECTRIC COMPANY, A CORPORATION OF NEW YORK.

VALVE.

Application filed February 3, 1925. Serial No. 6,649.

My invention relates to valves in general and more in particular to valves in which the portion of the operating stem that projects beyond the valve chamber is sealed off. In valves of the foregoing character, it is a common construction to have the operating stem project through a packing gland. Within the valve chamber, however, a metallic compressible chamber is provided about the gland and about the stem so as to ensure against any leakage through the gland. Metallic compressible chambers of the type in question are known to the art as sylphon cushions. Valves of this type are sometimes spoken of as sylphon valves. Valves of this type have been used to take the place of the usual stem-packed valves for the reason that such stem-packed valves are not sufficiently reliable inasmuch as the packing periodically becomes loose producing, of course, a leaky valve. On the other hand, when the packing is first installed, it may be too tight requiring a great deal of force to operate the valve. The advantage of the sylphon valve is that it may be operated without packing. The advantage of such valves is that they may be readily operated by means of an electromagnet.

There is this objection of the sylphon valve as heretofore constructed; namely, that the pressure of the medium under control such as oil, water or other fluid is directly in contact with the inner side of the sylphon seal with the reuslt that the pressure tends to lift the valve. This pressure has to be counteracted by a spring interposed inside the sylphon chamber which is usually coiled about the stem in this chamber. With sylphon valves of the prior art, springs of varying powers have to be supplied with varying pressures if ease of operation is to be had.

For example, in the case of the valve having a valve area of about 1/10 of a square inch, the smallest commercial sylphon that may be had has an area of about one square inch. Therefore, there is a difference in area of about 9 square inches. With an operating pressure of 100 lbs. per square inch, for example, for the fluid, a spring adapted to exert a counterpressure of about 90 lbs. would be necessary. Under these conditions, if it is desired to open the valve while the fluid pressure is zero, it would be necessary to operate the valve against this 90 lbs. pressure, consequently, if the valve is to be electromagnetically operated, it would take a magnet of considerable strength.

One of the objects of my invention is to provide an inner valve with a sylphon seal so constructed that it is not necessary to provide a spring counter pressure to balance the pressure of the fluid system. Another object of my invention is to provide an arrangement such that the operating stem through which the pressure is applied for operating the valve is not operated longitudinally but is constructed to move about a pivot and to provide other features of improvement for increasing the efficiency and serviceability of a valve of the above character.

The means for accomplishing the foregoing are hereinafter more fully set forth and claimed, reference being had to the accompanying drawing in which Fig. 1 shows the valve in elevation and in section; Fig. 2 is a bottom view of the element containing the bearings of the pivots of the operating stem; Fig. 3 is a section on line 3—3, Fig. 2; Fig. 4 is a top view of the chamber containing the flexible sealing element. Figs. 5 and 6 are modifications of the device.

Referring more in detail to the drawing, it will be seen that the valve is constructed with its usual intake terminal 2 through which the fluid passes into the device from the intake pipe 3. The fluid then passes into the chamber 4 in which chamber the valve disc 5 is located and held by the compression spring 6 against the valve seat 7. The valve disc 5 projects through the seat opening and terminates beyond in the valve stem 8 which stem projects into a second chamber 9 in which the flexible sealing element 10, such as a sylphon element, is located. For operating the valve, I provide a stem 11 which is arranged to oscillate about a pivot 12. The forward portion 13 of the stem 11 extends into the chamber 9 and is arranged in juxtaposition to and in operative engagement with the valve stem 8. The chamber 9 is provided with a cap ring 14, the underside of which is provided with a pair of elements 15 projecting inwardly, the ends of which serve as bearing 16 for the pin 12.

The elements 15 are located within the flexible chamber 10. The chamber, itself, is hermetically sealed or attached to the ring 17 which is held between the ring 14 and the rim of the chamber 9. The rings 17 and 14 are clamped to the chamber 9 by any suitable means such as the screws 18. The lower portion of the stem 11 passes through the lower end of the flexible chamber 10, the point of passage being hermetically sealed.

It will be seen that the chamber 9 is provided with an outer terminal 19 to which the outlet pipe 20 is connected. It will be seen also that the compression spring 6 in the chamber 4 is held in place by a nut in the element 20 which nut may be removed for the purpose of removing the spring 6 and the valve ring 5, together with its stem 8.

As a matter of construction, I have illustrated the element containing the chamber 4 and the element containing the chamber 9 as being separate. These two elements as shown in the drawing may be screwed together.

From the construction shown therefore, the valve may be opened by depressing the operating stem 11 with the result that the stem is rotated about the pivot 12 so that the inner terminal of the stem engages the stem 8 thus raising the valve ring 5 and opening the valve so that the fluid may flow in the direction of the outlet 20. When the pressure is released from the stem 11, the spring 6, together with the pressure of the fluid, will serve to close the valve automatically. It will be understood, of course, that the stem 11 may be operated in any suitable manner as, for example, through the medium of an electro-magnet. Inasmuch as the pivot 12 is located near the fixed end of the sylphon 10; i. e. near the ring 17, the sylphon is permitted to be flexed sideways for the purpose of raising the stem 8, thus avoiding the necessity of expanding and contracting the sylphon element 10 longitudinally as in the case of valves of this general character heretofore employed.

With my improved construction therefore, it is possible to use comparatively large pressures in the fluid without disturbing the ease of operation of the valve stem 8 or of the operating lever.

It will be understood that while the flexible metal element makes a convenient method of construction a metal or fabric diaphragm 21 may be substituted as indicated in Fig. 6.

It will be seen, therefore, that I provide a fluid tight connection about the pivot or about a lever, one end of which lever serves to actuate a valve inside of the valve chamber in which a fluid is present under pressure. The other side of the lever, which is open to the air, serves as an operating lever. In this construction, the pivots of the stem 11 prevent the flexible member from collapsing.

It will be seen, therefore, that my invention involves the combination of a cup, a section of which is flexible and a pivot lever attached to the cup in such a manner that by moving the lever about its pivot, the cup may be flexed to one side. It will be seen, of course, that the rim of the cup is secured to a fixed support and that the pivot has a bearing on a fixed support. Notwithstanding this stationary relation of the portion of the cup and of the pivot bearing, it is possible to move both of these elements. The result is that it becomes possible to operate a valve the stem of which is within a sealed chamber. While I have shown the lever as projecting through the bounding material of the cup, it is not absolutely essential that this should be the case inasmuch as it is possible to secure the one end of the lever to the inside of the cup and allow the bottom of the cup directly to operate the valve as I have indicated in Fig. 5.

It will be understood that it is altogether possible and it is within the contemplated scope of my invention to provide the lever with its pivot elsewhere than in the inside of the cup. For example, the pivot may be located at some point within the chamber 9. It is also possible to locate the pivot just beyond the mouth of the chamber, as in Fig. 6 and, consequently, it is obvious that my invention may be practiced with quite a number of variations of structure.

While I have elected to illustrate my invention in connection with a specific structure, it will be understood that I do not wish to be so limited inasmuch as, in view of the disclosure, variations may be readily carried out by those versed in the art without departing from the spirit of the invention or from the scope of the claims herein.

What I claim as new and desire to secure by Letters Patent of the United States is:—

1. In combination with a conduit system for conveying a fluid, a valve within the conduit for controlling the flow of the fluid in the system, an opening in the side of the conduit and a flexible cup within the conduit serving as a seal about said opening, the outside walls of the cup serving to prevent the fluid from passing to the inside of the cup, a lever mounted in proximity to the cup and extending outside the conduit through said opening, and means for operating said valve through the medium of said lever and said cup.

2. In combination with a conduit system for conveying a fluid, a valve mechanism located within the system, a flexible corrugated cup within the system with its rim anchored to the side of the conduit and about an opening in the conduit, said cup serving as a seal about said opening to keep the fluid from inside the cup, a lever, a frame about said opening secured to said conduit and projecting into said cup, said lever projecting through said opening and into said cup and secured to the bottom of said cup, said lever being provided with a pivot support, said pivot support anchored in said frame whereby the said lever may oscillate about said pivot, and means interposed between the cup and the valve whereby the valve may be operated by flexing the cup.

3. In combination with a conduit system for conveying a fluid, a valve mechanism located within the system, a flexible corrugated cup within the system with its rim anchored to the side of the conduit and about an opening in the conduit, said cup serving as a seal about said opening whereby the fluid is prevented from entering the cup, a lever, a frame about said opening secured to said conduit and projecting into said cup, said lever projecting through said opening and into said cup and secured to the bottom of said cup, said lever being provided with a pivot support, said pivot support anchored in said frame whereby the said lever may oscillate about said pivot, an element projecting into the conduit system from the bottom of the cup, said element being located in operative relation to said valve whereby the valve may be operated by operating said lever about said pivot support.

In witness whereof, I have hereunto set my hand this 2nd day of February, 1925.

LEONARD P. HUTT.